April 26, 1949.    R. BLUMA    2,468,585
PROCESS FOR PRODUCING PELLICLES
Filed Feb. 8, 1946
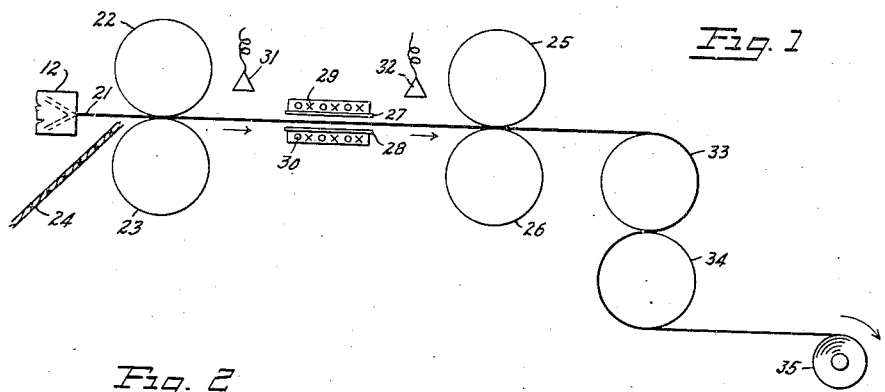
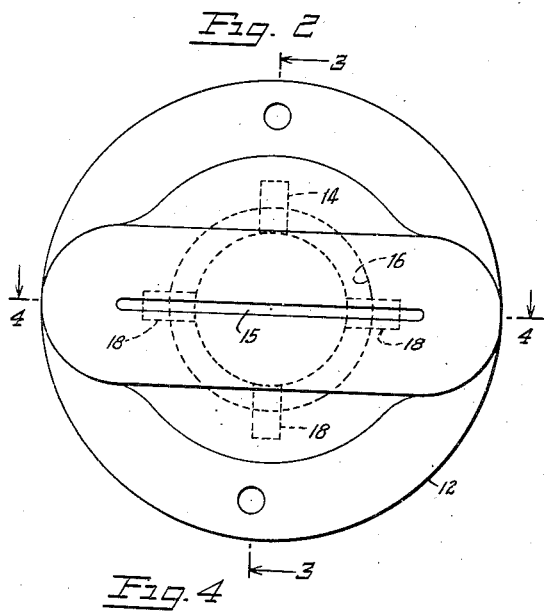
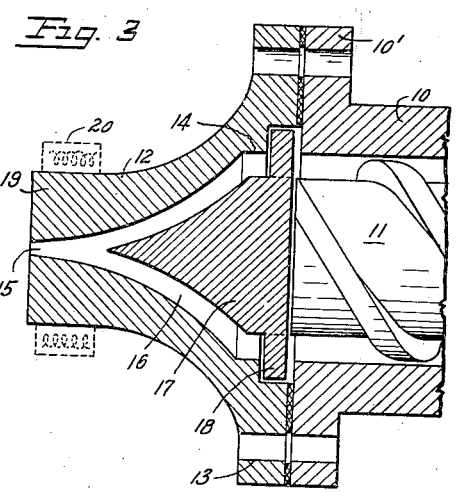
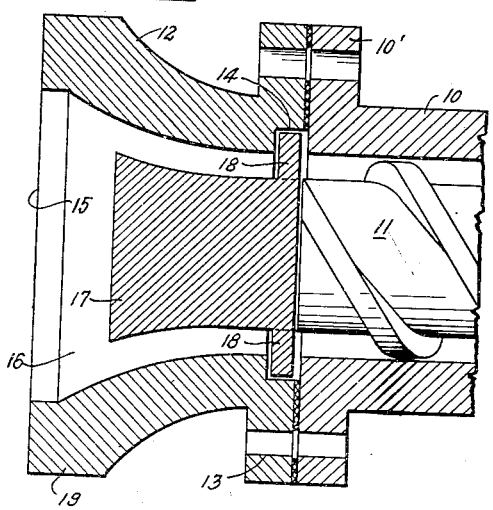
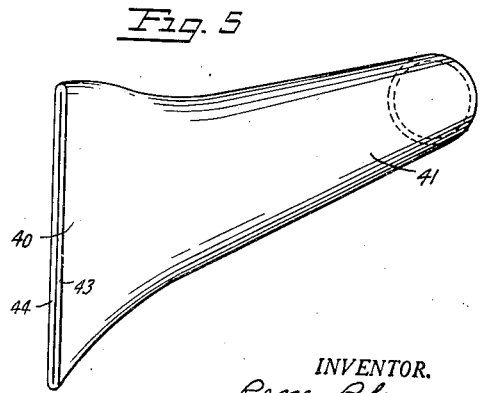
INVENTOR.
Rene Bluma
BY
Dale A. Bauer
ATTORNEY.

Patented Apr. 26, 1949

2,468,585

UNITED STATES PATENT OFFICE 2,468,585

PROCESS FOR PRODUCING PELLICLES

René Bluma, Asnieres, France, assignor to Societe Anonyme des Manufactures des Glaces et Produits Chimiques de Saint-Gobain, Chauny & Cirey, Paris, France Application February 8, 1946, Serial No. 646,422
In France February 15, 1945

3 Claims. (Cl. 18—57)

The invention relates to novel methods of making pellicles from plastic materials. The invention will be described by the relation of a preferred process and by the illustration of a preferred apparatus, but it is to be understood that these particular descriptions are selected for convenience and do not constitute a limitation.

The term pellicle includes plastic films, sheets and the like which are of continuous and integral surface and usually of small thickness compared to other dimensions.

It is an object of this invention to make pellicles from plastic materials and particularly from thermo-plastic materials exemplary of which are: cellulose acetate and other cellulose derivatives (cellulose triacetate, cellulose acetobutyrate, cellulose propionate, ethylcellulose, benzylcellulose, etc.) polyvinyl chloride and other vinyl compounds (copolymers containing vinyl chloride, polystyrol, etc.) acrylates, methacrylates, polyamides, polyethylenes, polyisobutylenes, natural and synthetic rubbers. This invention is adapted to the processing of all such materials, due attention being paid to properly alter the details of the process to adapt it to the nature of the material being worked with.

Another object of the invention is to produce a laminated pellicle. Lamination tends to imply thickness, but it is to be understood that this process is capable of producing laminated pellicles of extreme thinness.

Another object of the invention is to produce pellicles by the extrusion of a tube of plastic material and the integrating of the collapsed walls of the tube.

Another object of the invention is to produce a pellicle and subject it to a rolling or calendering operation whereby to obtain improved physical properties and improved appearance.

Another object is to subject a pellicle to a drawing or stretching operation whereby to impart to the pellicle useful and novel characteristics and to produce orientation.

Another object of the invention is to produce the products by novel processes involving the extrusion of a plastic material, the calendering thereof, the drawing thereof, the orienting of the internal or surface structure thereof, and the perfecting thereof by novel treatments or by the combining of old treatments in novel ways.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views, Fig. 1 is a diagrammatic elevational side view of a combined apparatus adapted to produce a pellicle by extrusion, to subject it to a rolling operation, to various treatments designed to impart favorable physical characteristics to it, and to stretch it;

Fig. 2 is a front elevational view of an extrusion nozzle;

Fig. 3 is a section on the line 3—3 of Fig. 2, looking in the direction of the arrows;

Fig. 4 is a section on the line 4—4 of Fig. 2, looking in the direction of the arrows; and Fig. 5 is a perspective view of the plastic material within the nozzle substantially as it appears during production.

The structure shown in the drawings is an illustrative, but preferred, embodiment of the invention wherein the numeral 10 indicates a delivery pipe that is adapted to carry plastic material from a reservoir to the extrusion nozzle 12. The pipe 10 is provided at its end with a flange 10', and the nozzle is provided with a flange 13, the two flanges conforming in shape and having aligned holes which permit the nozzle to be firmly affixed to the end of the pipe by means such as bolts, which are not shown.

Within the pipe 10 is a screw conveyor 11 the rotation of which delivers the plastic material to the nozzle at a uniform rate. The screw may be run at various speeds by variable speed apparatus of types familiar to engineers.

The nozzle contributes largely to the success of the invention. Its inner shape at the place where it abuts the pipe 10 is round and its inner circumference is equal to the inner circumference of the pipe 10, except that four notch seats 14 are provided for the reception of projections 18 of the removable plug 17 which, during the operation of the apparatus, is seated firmly in position and guides the plastic material from the pipe 10 to the orifice 15. The orifice 15 is long and thin. The nozzle about the orifice has its wall of uniform thickness and is adapted to receive a ring-shaped heating element 20, that is indicated in dotted lines in Fig. 3. The element 20 could also be a cooling element in conditions that call for the chilling of the plastic as it leaves the nozzle.

In many instances it is of importance to the proper carrying out of the process that the plastic as it leaves the nozzle shall be at a particular temperature, and that it shall be uniformly of that temperature throughout its width. The use, for example, of a circumscribing electrical heating unit 20 permits the accurate control of the temperature of the plastic at the nozzle, and the uniform thickness of the wall of the nozzle insures the even distribution of the heat throughout the pellicle.

The inlet section of the nozzle is fitted to the extremity of the pipe 10 and the outlet section is thus flattened to the determined section of the pellicle. The shape of the nozzle section, from the inlet face to the outlet face, progressively varies in such a way that the area of all vertical sections is maintained at a practically constant value from the inlet to the outlet. It is particularly advantageous to associate this type of nozzle with a screw extruding machine, as shown in the drawings. The passage in the nozzle has a section that is substantially equal to the section of the pipe that delivers the plastic. At its inlet the passage through the nozzle has the perimeter and thickness of the passage in the pipe and changes its shape from a ring to a flat shape while maintaining substantially the same perimeter and the same thickness. The interior of the nozzle is carefully machined, and the guiding face of the plug 17 is carefully machined so that no irregularities or obstructions hinder the free flow of the plastic. In this way the novel apparatus feeds the plastic in a homogeneous manner, the cross-section of the band being as regular as required. The forward movement of the material is remarkably regular in spite of the change in shape and involves a minimum of internal movement of the material so that the latter is not subjected to any change in orientation by the nozzle, the flat product obtained at the outlet still having the texture of the material delivered by the screw. This produces special advantages of regularity and homogeneity. This combination is for most purposes ideal for the continuous production of pellicles.

In calculating the size of the orifice 15 it is frequently convenient to employ a length equal to half the circumference of the screw 11 of the extruding machine. It may be considered that the plastic is delivered to the nozzle as a tube and that the nozzle simply collapses and flattens the tube without causing any substantial internal rearrangement of its structure. This is illustrated in Fig. 5 which is intended to show the pellicle from the time it enter the nozzle as a tube to the time it leaves the nozzle as a collapsed pellicle.

It is to be understood that other delivery means than a screw can be employed to feed the plastic to the nozzle and that various changes in shape and arrangement of the parts can be adopted without departing from the spirit of the invention. The temperature at which the plastic will be fed to the nozzle will vary according to the nature and condition of the plastic, and the temperature at which it leaves the nozzle will be adjusted with a view to obtaining the most efficient operation of the succeeding steps of the process.

The apparatus shown in Fig. 1 has a number of elements of high utility which contribute to the new and useful results which are obtained by the process in combination. In that figure, which is a vertical elevational view of a variety of apparatuses assembled in combination for the treatment of a pellicle, the numeral 12 indicates a nozzle from which a pellicle 21 issues and passes between two rollers 22, 23. These rollers have highly polished surfaces and bear upon the pellice with enough force to flatten it, compress it, or to remove wrinkles therefrom, and to draw it smoothly and evenly from the nozzle. The rollers may be heated to produce a drying, a calendering or a curing effect upon the pellicle, the temperatures employed being attained by heating the rollers interiorly by means of hot liquids or gases or by means of heating elements of understood construction, the particular temperature being chosen with respect to the particular treatment which is desired, which will in turn be to some extent dictated by the substance which is being processed. The rollers 22, 23 are given a linear speed which is a little higher than, or at least equal to, the speed with which the pellicle is ejected from the nozzle. Where the two speeds are equal, the pellicle passes between the rollers in unstretched condition, with its interior arrangement unchanged. When the rollers are operated at a higher speed the pellicle is subjected to some stretching between the nozzle and the rollers. The speed of the rollers will never be such as to snap the pellicle, but will always be controlled so that the stretch imparted improves and does not degrade the pellicle. The amount of stretch which can be imparted to the pellicle between the nozzle and the rollers 22, 23 will depend upon the nature of the plastic and particularly upon its tenacity.

On some occasions it is intended to apply the pellicle to fabric. This can be accomplished as indicated in dotted lines by the numeral 24, of Fig. 1. The numeral 24 diagrammatically shows a fabric being passed between the rollers 22, 23, the pellicle being superimposed upon the fabric. Coating and even impregnation of the fabric by the pellicle can thus be accomplished. In some instances it is desirable to run the rollers 22 and 23 at somewhat different speeds so as to create a friction that is well adapted to cause the impregnation of the fabric by the pellicle.

It is generally desirable to transfer the pellicle from the nozzle 12 to the rollers 22, 23 without tension. In many cases where the pellicle issues from the nozzle containing residual water or solvent, it is desirable to employ heating means therebetween in order to improve the physical strength of the pellicle before it reaches the first pair of rollers. Infra-red or other heating means can be employed at will. In general the process will be so operated that the pellicle has acquired sustantial strength by the time it is gripped between the rollers 22 and 23 so that from that point forward it may be subjected to stretching operations of positive character. For this purpose a second pair of rollers 25, 26 are provided which may be of construction similar to rollers 22 and 23, bearing upon the pellicle with sufficient firmness to prevent the formation of wrinkles during the stretching operation. Rollers 25, 26 are operated at higher speeds than rollers 22, 23 so that the pellicle is elongated between the said rollers. This continuous traction causes an orientation of the material, improves its mechanical properties, and polishes its surfaces so that the properties, both physical and mechanical, of the pellicle are altered and improved. The degree of extension to which the pellicle will be subjected between the two sets of rollers will depend upon the material being drawn, its capacity, and the purpose for which it is being stretched. The cylinders 25 and 26 may also be heated or cooled in the same manner as rollers 22, 23. In between the two sets of rollers, the pellicle may be passed between iron, aluminum or other metal plates 27, 28 which may be heated by means 29 or cooled by means 30. Infra-red rays may be applied to the pellicle by means 31, or induction currents caused to operate upon it by means 32. All the said means are diagrammatically illustrated in the drawing.

By the foregoing arrangement of parts and combination of apparatuses it is possible to produce in the material being treated different effects and different characteristics, depending upon the degree of extension and the conditions under which the extension is carried out.

In some cases it is desirable to subject the film to a single stretching, in others it is desirable to subject it to a plurality of stretching operations, for instance, it may be drawn in the cold between the first two sets of rollers of which the second set is heated, thereafter being drawn at higher temperature between rollers 25, 26 and rollers 33, 34. The roller 33, for example, may be cooled so that the pellicle delivered to the wind-up drum 35 is in its final stable state. Any desired combination of heating and cooling may be employed for the production of modifications in the form of the pellicle, its mechanical strength, or its internal or surface orientation.

The methods of controlling the speeds of the rollers, and of heating them, are so well known that they have not been illustrated in the drawings, it being understood that any standard means which gives adequate control of speed and temperature can be usefully employed.

The products produced by this process are of superior characteristics. In Fig. 5, for example, is shown the production of a laminated pellicle 40 as it issues from the nozzle shown in Fig. 2. Within the nozzle the plastic is in the form of a tube 41 which is collapsed and flattened by the nozzle until it issues as a pellicle having two thicknesses 43, 44. The thickness of this pellicle may be less than one-half millimeter. Under certain conditions of the pellicle and calender pressure, the laminar nature of the pellicle will disappear, the two layers becoming in effect completely integrated but in other cases where the conditioning of the pellicle is farther advanced when it reaches the calender, the two layers will be permanently conjoined throughout their contacting surfaces, but demarcation will still be visible.

A particular advantage of this product is that the pellicle has a round edge, which imparts great tear resistance to it. This is in distinction to the prior art types wherein the pellicles have raw or cut edges. The thickness of the pellicle will be determined by the width of the orifice of the nozzle in the first instance, and by the extent of stretching in the second. The laminar form of the invention has advantages with respect to pellicles of the same weight made by methods known to the prior art.

An advantage of the extruding apparatus is that it tends to produce a pellicle of great homogeneity free from flaws and defects that arise from disturbances in the plastic within the extruding apparatus.

Another advantage of the invention is in the process of laminar extrusion of pellicles.

Other advantages of the invention arise from the close control of temperature, which in combination with close control of tension at all stages of the process is adapted to produce pellicles of exceptional physical and mechanical properties.

Another advantage of the invention is in the production of pellicles of different states of internal and surface orientation.

The following specific examples are given for purposes of illustration only, both as to the plastics employed and the particular conditions of the process employed upon the plastics:

Example 1

A screw-extruding machine, the inner diameter of which is 40 mm. is fitted with a nozzle, as shown in the drawings, the outlet orifice of which has a length of 60 mm. and a width of 0.5 mm. The machine is fed with polyvinyl chloride, the molecular weight of which is between 30,000 and 40,000, and to which has been added 0.5% of aluminium stearate as a lubricant.

The temperatures and speeds are controlled as follows:

For pipe and nozzle (as shown on Figs. 2, 3, 4):
  Temperature of the extremity of the pipe 10: 80°/90° C.
  Temperature around flanges 10', 13: 110°/120° C.
  Temperature of the nozzle: 150°/160° C.
  Speed of the pellicle issuing from the nozzle: 20 meters per minute.

For set of rollers 22, 23 (as shown on Fig. 1):
  Temperature of the rollers: 150°/160° C.
  Linear speed of the rollers: 25 meters per minute.
  Thickness of the pellicle issuing from the rollers: $\tfrac{3}{10}$ mm.
  Width of the pellicle issuing from the rollers: 80 mm.

For set of rollers 25, 26 (as shown on Fig. 1):
  Temperature of the rollers: 140°/150° C.
  Linear speed of the rollers: 30 meters per minute.
  Thickness of the pellicle issuing from the rollers: $\tfrac{2}{10}$ mm.
  Width of the pellicle issuing from the rollers: 100 mm.

For set of rollers 33, 34 (Fig. 1): Temperature of the rollers: 20°/30° C.

Pellicles thus obtained may be used as wrapping sheets particularly resistant to chemical attacks.

Bands of the desired width may be cut from the pellicles thus obtained and used for insulating electrical cables.

Example II

The same apparatus as in the preceding example is fed with molding powder of cellulose acetate containing:

| | Parts |
|---|---|
| Cellulose acetate having a content of 54 to 56% of acetyl | 70 |
| Dimethoxyethylphthalate as a plasticizer | 20 |
| Diethylphthalate as a plasticizer | 5 |
| Tricresylphosphate as a fire-proofing material | 5 |

The speeds, thicknesses and widths are the same as in the preceding example. The temperatures are the following:

Extremity of the pipe 10: 60°/70° C.
  Around flanges 10', 13: 100°/110° C.
  Nozzle: 130°/140° C.
  Rollers 22, 23: 130°/140° C.
  Rollers 25, 86: 120°/130° C.
  Rollers 33, 34: 20°/30° C.

The pellicles thus obtained may be used for the production of camera films and light and resistant wrapping sheets.

As many apparently widely different embodiments of the invention may be made without departing from the spirit and scope thereof, it is to be understood that the invention is not limited to the specific embodiment thereof except as defined in the appended claims.

What is claimed is:

1. A process of making a flexible pellicle from a fluid plastic that can be made self-sustaining by temperature control that includes the steps of forming the fluid plastic into a coherent tube, advancing and gradually flattening the tube until its flattened sides are brought into contact, and so controlling the temperature of the tube that its flattened walls are joined to each other throughout and the plastic is hardened as a smooth pellicle with parallel edges that are rounded transversely.

2. A process of making a flexible pellicle from a fluid plastic that can be made self-sustaining by temperature control that comprises extruding said plastic through a nozzle having a passage leading to an orifice, said passage being annular in the portion leading to the orifice, said annular portion being gradually widened and flattened until it becomes a slit at the orifice in which opposite sides of the tube are brought together before extrusion, and controlling the temperature of the plastic so as to cause it to issue from the orifice as a collapsed tube having its opposite sides joined together and having edges that are longitudinally straight and laterally curved.

3. The process of claim 1 in which the flattened tube is subjected to pressure to assist in uniting its walls.

RENÉ BLUMA.

REFERENCES CITED

The following references are of record in the file of this patent:

UNITED STATES PATENTS

| Number | Name | Date |
|---|---|---|
| 1,752,636 | Izumi | Apr. 1, 1930 |
| 2,070,600 | Jenett | Feb. 16, 1937 |
| 2,177,633 | Blackard | Oct. 31, 1939 |

FOREIGN PATENTS

| Number | Country | Date |
|---|---|---|
| 419,826 | Great Britain | May 18, 1934 |